INVENTORS:
GREGORY W. DOLL and
BRENDAN L. DOLL

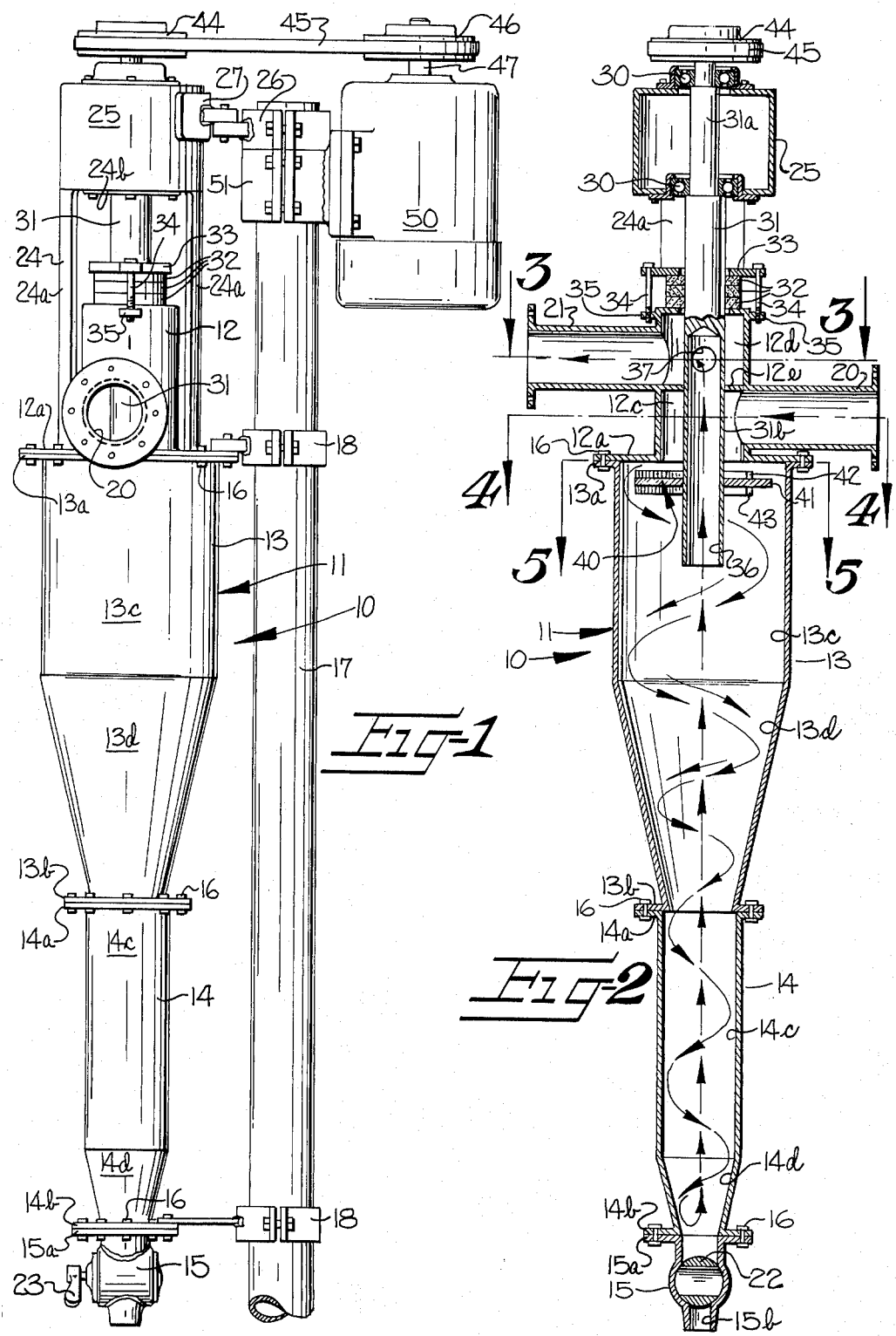

BY Eaton, Bell, Hunt + Seltzer

ATTORNEYS

United States Patent Office

3,235,091
Patented Feb. 15, 1966

3,235,091
CENTRIFUGAL SEPARATOR
Gregory W. Doll, 118 Oakwood Drive, Lenoir, N.C., and Brendan L. Doll, Patterson, N.C.
Filed Mar. 28, 1963, Ser. No. 268,763
9 Claims. (Cl. 210—512)

The present invention relates to centrifugal separators of the free vortex type, which are operable on mixtures of liquid and solid particles suspended therein for separating undesirable solid impurities from the liquid mixture. More particularly, the separator of the present invention is particularly concerned with the removal of such impurities from paper stock slurries of varying consistency, which impurities may be in the form of sand, metal, dirt, and other solids.

There are many conventional centrifugal separators of the free vortex type available today and such separators are classifiable into two general classes, the first of these being the true free vortex separator wherein the liquid mixture is directed into the separator at a high input pressure in a tangential path such that the liquid mixture assumes a rotary path of travel in the separator which forms the vortex. The swirling liquid mixture is then moved downwardly into a cyclone chamber in the separator and then upwardly where the lighter liquid and particles suspended therein are drawn off through a suitable siphon tube.

The other general type may be termed a modified free vortex separator since the same does not utilize a high input pressure, but the liquid mixture enters the separator at a low input pressure. A mechanically operated impeller is provided in this type of separator for imparting the necessary rotary motion to the liquid to create the vortex. Once the vortex is created by the mechanically operated impeller, the modified free vortex separator then functions as a true free vortex with the swirling liquid mixture moving downwardly into a cyclone chamber and then upwardly where the lighter liquid and particles suspended therein are drawn off through a siphon tube.

The patents to Goodwin No. 2,701,642 and Kronstad No. 2,856,072 disclose conventional modified free vortex separators wherein the liquid mixture is directed into the separator at a low input pressure generally axially of an impeller and wherein the impeller comprises a solid baffle member having vanes on the upper surface thereof. These vanes impart the necessary rotary motion to the incoming liquid mixture and cause the same to move outwardly against the inner surface of the wall of the separator by centrifugal force to thereby create the vortex.

As is well known in a free vortex separator, the swirling liquid mixture adjacent the center of the vortex is traveling at a greater angular velocity than the liquid mixture adjacent the outer portion of the vortex. Since only the lighter liquid and particles suspended therein of the upwardly swirling liquid mixture are drawn off through the siphon tube, the remainder or heavier portions of the upwardly swirling liquid mixture recirculates in the vortex until either separated out or drawn off through the siphon tube. However, this recirculation of the liquid mixture has heretofore only been possible under flow conditions wherein liquid mixture is being continuously added to and withdrawn from the vortex. Therefore, if the flow through conventional centrifugal separators is interrupted for any reason, the liquid mixture in the vortex slows down due to friction, liquid shear, or other losses and collects in the lower portion of the separator which is highly undesirable for reasons that are apparent. This breakdown of the vortex in conventional separators upon termination of the flow therethrough results since such conventional centrifugal separators have no means for adding energy to the liquid mixture in the vortex under no flow conditions.

Also, in conventional modified free vortex centrifugal separators, the power required to operate the impeller constitutes a major factor in the cost of operation thereof and therefore, it is highly desirable to maintain the power requirements as low as possible. Since there is a balance, i.e. no appreciable rise or drop, between inlet pressure and outlet pressure in most modified free vortex separators, all of the energy added to the incoming liquid mixture by the impeller of a conventional modified free vortex is consumed by losses, such as friction, liquid shear, turbulence or heat, since no means is provided therein for recovering any of this energy from the liquid mixture within the vortex and before the same is drawn off by the siphon tube. Therefore, the power requirements of conventional modified free vortex separators are high and consequently, these separators are very expensive to operate. In addition, the power required to operate such separators varies considerably with any variance in the rate of flow of the liquid mixture through the separators which is highly undesirable for apparent reasons.

It is therefore an object of the present invention to provide a centrifugal separator of the modified free vortex type wherein the liquid mixture is recirculated within the separator during periods of flow interruption in the line in which the same is connected to maintain the vortex and prevent the liquid mixture from collecting in the lower portion of the separator.

Another object of the present invention is to provide a centrifugal separator of the modified free vortex type wherein the power required to operate the separator is substantially reduced over conventional separators of this type and wherein the power requirements are substantially constant irrespective of variance in the rate of flow of the liquid mixture through the separator.

Some of the objects of the invention having been stated, other objects will appear as the description proceeds when taken in connection with the accompanying drawings, in which:

FIGURE 1 is a fragmentary side elevational view of an apparatus which includes the features of the present invention;

FIGURE 2 is a vertical section through the apparatus shown in FIGURE 1;

Figure 3:
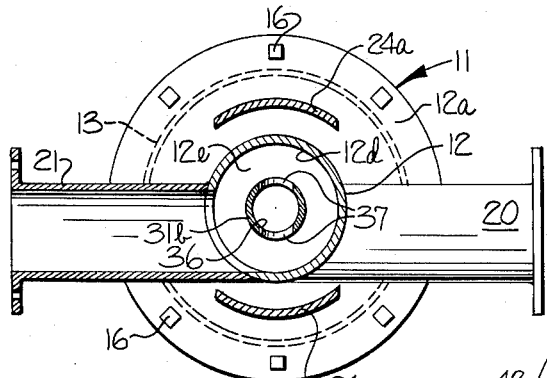
FIG. 3 is a horizontal section taken substantially along line 3—3 in FIGURE 2.
Figure 4:
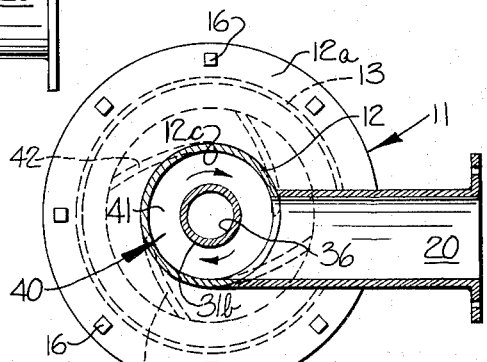
FIGURE 4 is a horizontal section taken substantially along line 4—4 in FIGURE 2.
Figure 5:
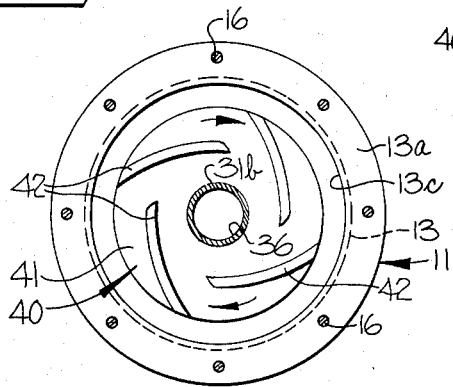
FIGURE 5 is a horizontal section taken substantially along line 5—5 in FIGURE 2.

Referring now to the drawings and more particularly to FIGURE 1, there is shown a centrifugal separator 10 which includes a vertically disposed elongate housing 11. Housing 11 includes an upper section 12, an elongate upper vortex section or chamber 13 connected to the lower end of upper section 12, a lower vortex section or chamber 14 connected to the lower end of upper vortex section 13, and a collection section 15 connected to the lower end of lower vortex section 14. The sections of housing 11 are shown as being connected by flanges 12a, 13a, 13b, 14a, 14b and 15a and rivets 16 penetrating therethrough, but may be connected together by any suitable means withiut departing from the scope of the present invention. Housing 11 is mounted on a vertical column 17 by any suitable means such as split clamps 18.

Upper section 12 of housing 11 is cylindrical in configuration and is divided into lower and upper chambers 12c and 12d by partition 12e. An inlet conduit 20 is connected to upper section 12 in communication with the lower or inlet chamber 12c which has an outlet opening in the bottom thereof, which preferably is the same diameter as inlet chamber 12c, and communicates with upper vortex section or chamber 13 for supplying liquid mixture to the separator. An outlet conduit 21 is connected to section 12 in communication with the upper or outlet chamber 12d for removing liquid mixture from the separator. Preferably, conduits 20 and 21 are connected to upper section 12 in off-set relation to the center line of section 12 so that the incoming liquid mixture will follow a rotary path of travel in the inlet chamber 12c as the same moves downwardly out of the outlet opening therein and into upper vortex chamber 13 and the liquid mixture being discharged from the separator follows a rotary path of travel in outlet chamber 12d and flows into outlet conduit 21 generally tangentially of said rotary path of travel. This general tangential arrangement of outlet conduit 21 is preferred so that the liquid mixture being discharged will flow through conduit 21 with some retained pressure which is substantially the same as the pressure in inlet conduit 20. It is noted that the outlet opening of inlet chamber 12c, which is of the same diameter as inlet chamber 12c, presents no restriction to the downward flow of incoming liquid mixture into upper vortex chamber 13. Therefore, turbulence within inlet chamber 12c and outlet chamber 12d is minimized.

Upper vortex section or chamber 13 includes an upper cylindrical portion 13c of a greater diameter than upper section 12 and a lower inverted conical portion 13d communicating with upper cylindrical portion 13c.

Lower vortex section or chamber 14 includes an upper cylindrical portion 14c which is of a diameter substantially the same as the diameter of the lower end of conical portion 13d of upper vortex chamber 13 and communicates therewith, and a lower inverted conical portion 14d at the lower end of cylindrical portion 14c and communicating therewith. Collection section 15 communicates with the lower end of conical portion 14d of lower vortex chamber 14 and includes an outlet opening 15b through which the waste particles removed by the separator and collected in collection section 15 are discharged. A valve 22 is mounted in collection section 15 and is movable from a closed position (FIGURE 2) wherein the outlet opening 15b of collection section 15 is closed such that the waste particles removed from the liquid mixture by the separator collect in section 15 and an open position (not shown) wherein the outlet opening 15b is open to permit the collected waste particles to be discharged from the collection section 15. A handle 23 (FIGURE 1) is operatively connected to valve 22 to facilitate movement of valve 22 between the open and closed positions.

An inverted U-shaped bracket 24 (FIGURES 1 and 3) is mounted on flange 12a of upper section 12 and has the legs 24a thereof extending upwardly from flange 12a in straddling relation to the remainder of upper section 12. Legs 24a of U-shaped bracket 24 extend upwardly above the top wall of upper section 12 and the bight portion 24b of U-shaped bracket 24 overlies the top wall of upper section 12 in spaced relation thereto. A bearing housing 25 (FIGURES 1 and 2) is mounted on the bight portion 24b of U-shaped bracket 24 and is also connected to vertical column 17 by a split clamp 26 on the column and a bracket 27 mounted on the bearing housing.

Bearing housing 25 has mounted therein a pair of spaced bearings 30 which journal the upper end 31a of a shaft 31 for rotation therein. Shaft 31 extends downwardly from bearing housing 25 through a plurality of gaskets 32 mounted on the top wall of upper section 12 and held in assembled relation by a clamp plate 33 sandwiching the gaskets 32 between plate 33 and the top wall of upper section 12. The compression on gaskets 32 is maintained and varied by suitable bolts 34 extending through plate 33 and into threaded openings in bosses 35 on upper section 12.

Plate 33, the top wall of upper section 12 and the partition 12e within upper section 12 all have openings therein through which shaft 31 penetrates. Shaft 31 extends downwardly through inlet chamber 12c and into the cylindrical portion 13c of upper vortex section 13 and terminates in a free end a predetermined distance below the outlet opening between the inlet chamber 12c and the cylindrical section 13c.

Figure 6:
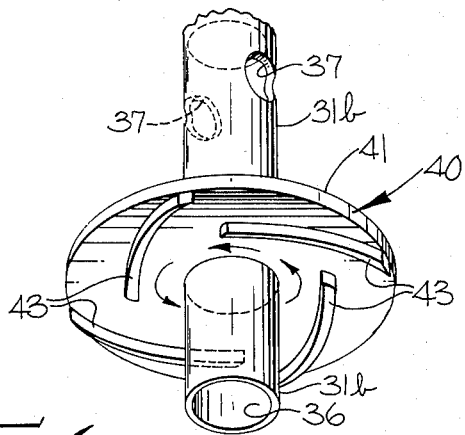
FIGURE 6 is a fragmentary isometric view of the impeller and siphon tube shown in the upper medial portion of FIGURE 2.

The portion 31b (FIGURES 2 and 6) of shaft 31 between the top wall of upper section 12 and the free end of shaft 31 is tubular with a centrally disposed opening 36 extending longitudinally thereof. Shaft 31 has a pair of diametrically opposed discharge openings 37 adjacent the upper end of the tubular portion thereof and communicating with the outlet chamber 12d so that the tubular portion 31b of shaft 31 defines a siphon tube from the interior of upper vortex section 13 to the outlet chamber 12d.

An impeller 40 (FIGURES 2 and 6) is mounted on shaft 31 beneath the opening between upper section 12 and upper vortex section 13 and comprises a solid or imperforate circulatr baffle member 41 mounted on shaft 31 for rotation therewith. Baffle member 41 is of such a radius that its outer periphery is spaced from the wall of cylindrical portion 13c of upper vortex section 13 a distance slightly greater than the diameter of the largest particle of solid matter suspended in the liquid mixture being worked upon. It is noted that it is desirable to have the outer periphery of baffle member 41 as close as possible to the wall of cylindrical portion 13c while still permitting all of the suspended particles of solid matter in the liquid mixture to pass therebetween.

A plurality of vanes 42 are mounted on the upper surface of baffle member 41 for rotation therewith and extend generally radially thereof. Vanes 42 are of predetermined height from baffle member 41 but have the upper surface thereof spaced from the lower surface of flange 12a of upper section 12. Each of the vanes 42 has its inner end spaced from shaft 31 and immediately underlying the inside surface of the wall of upper section 12 defining the opening between the inlet chamber 12c and upper vortex section 13. Also, the inner ends of vanes 42 are constructed so that the vanes are tangent to the point on the wall of inlet chamber 12c which the same immediately underlie. From their inner ends, vanes 42 curve outwardly to the periphery of baffle member 41 at which they terminate.

A plurality of vanes 43 are mounted on the lower surface of baffle member 41 and are identical in size and configuration with vanes 42 on the upper surface of baffle member 41. While the lower vanes 43 are preferably constructed identical to upper vanes 42, the same may extend inwardly to shaft 31 without departing from the scope of the present invention. It is noted that the free end of siphon tube portion 31b of shaft 31 is disposed a sufficient distance below vanes 43 on the lower surface of baffle member 41 so that any turbulence which may be created by vanes 43 in the upwardly moving liquid mixture will not interfere with the drawing off of the lighter portion of the liquid mixture by the siphon tube portion 31b.

A pulley 44 is drivingly mounted on the upper end of shaft 31 and supports one end of a belt 45, the other end of which is drivingly supported by a pulley 46. Pulley 46 is mounted on a drive shaft 47 of a suitable electric motor 50. Motor 50 is mounted on a split clamp 51 which, in turn, surrounds vertical column 17 and is held thereon by bolts 52.

In operation, separator 10 is preferably connected in a line (not shown) which is transporting the liquid mixture from one operation to another in its processing and the liquid mixture is directed into the inlet chamber 12c by inlet conduit 20. The liquid mixture then moves downwardly out of inlet chamber 12c and into the cylindrical portion 13c of upper vortex section 13.

The liquid mixture contacts the upper surface of baffle member 41 of impeller 40 which is being rotated by shaft 31 from motor 50. Impeller 40 accelerates the incoming liquid mixture by action of upper vanes 42 thereon to impart rotary motion thereto and forces the same outwardly against the wall of the cylindrical portion 13c by the configuration of vanes 42 and aided by centrifugal force.

When sufficient rotary motion has been imparted to the incoming liquid mixture and the pressure in the portion of upper vortex portion 13 above baffle member 41 has been raised to a predetermined level, the rotating liquid mixture is forced downwardly in the cylindrical portion 13c of upper vortex section 13 by the subsequently incoming liquid mixture and a vortex is established. This downwardly moving, rotating liquid mixture then moves into the inverted conical portion 13d where the same is forced inwardly toward the axis of the vortex section and thereby causing the angular velocity of the liquid mixture to increase.

During this downward movement of the rotating liquid mixture, the heavier particles therein are forced outwardly toward the wall of upper vortex section 13 by centrifugal force while the lighter particles move inwardly toward the axis of the vortex. Therefore, the heavier particles move downwardly in the outer portion of the vortex and the lighter particles move downwardly in the inner portion thereof.

From the conical portion 13d of upper vortex section 13, the downwardly moving, rotating liquid mixture continues its downward movement through the cylindrical portion 14c of lower vortex section 14 and into the conical portion 14d thereof. The liquid mixture is then turned back upon itself and moves upwardly while continuing its rotation. The heaviest particles of solid matter are separated from the liquid mixture upon this upward movement and are collected in section 15 for subsequent discharge.

As the liquid mixture moves upwardly, heavier particles thereof move outwardly into the downwardly moving liquid mixture and lighter particles from the downwardly moving liquid mixture move inwardly into the upwardly moving liquid mixture and are carried upwardly therewith. The siphon tube portion 31b of shaft 31 receives the innermost portion of the upwardly moving liquid mixture, which continues to move upwardly in opening 36 through and out of the openings 37 in the upper portion thereof into outlet chambers 12d. This liquid mixture then flows outwardly through outlet conduit 21 and continues on through the line in which the separator is connected.

The portion of the upwardly moving, rotating liquid mixture which is not drawn off through the siphon tube portion 31b of shaft 31 continues its upward movement until the same contacts the lower surface of baffle member 41. Since his upwardly moving liquid mixture has a higher angular velocity than the liquid mixture in the outer portion of the vortex and, hence, a higher angular velocity than baffle member 41 and vanes 43 on the lower surface thereof, the upwardly moving, rotating liquid mixture tends to drive impeller 40 and thus, imparts energy thereto. The portion of the liquid mixture acting upon vanes 43 to impart energy to impeller 40 is, in turn, acted upon by the rotating liquid mixture in the remainder of the vortex, including the rotating liquid mixture in the innermost portion of the vortex which will subsequently be drawn off by the siphon tube portion 31b of shaft 31. Therefore, a portion of the energy which has been added to the liquid mixture by vanes 42 on the upper surface of baffle member 41 is recovered from the liquid mixture by vanes 43 on the lower surface of baffle member 41 before the liquid mixture is drawn off by the siphon tube portion 31b of shaft 31. Therefore, the power which must be supplied to shaft 31 for operation of the separator 10 is considerably reduced.

In this regard, it has been determined by tests using standard measuring instruments commonly used to measure the power required to operate electric motors that the power which must be supplied by motor 50 to shaft 31 for operation of the separator of the present invention is considerably lower than is required by conventional separators. Further, such tests have revealed that there is a power balance in the operation of the separator of the present invention, that is, that the power required for operation of the separator is substantially constant irrespective of the rate of flow of liquid mixture through the separator. In this regard, it has been determined that upon maximum flow of the liquid mixture through the separator, motor 50 will require a given amount of power to rotate impeller 40, and upon flow of the liquid mixture through the separator which is less than the maximum including complete interruption of such flow there is no appreciable or measurable change in the power being utilized by motor 50 to drive impeller 40.

Further, upon complete stoppage or interruption of the flow of the liquid mixture through the separator, there is no liquid mixture entering the separator to be acted upon by vanes 42 on the upper surface of baffle member 41 and therefore there is no liquid mixture to be accelerated thereby. Therefore, in the absence of vanes 43 on the lower surface of baffle member 41, there would be no means for maintataining the liquid mixture rotating and the vortex would be destroyed by friction and other losses. However, vanes 43 in the instant separator act upon the liquid mixture to add energy thereto to overcome such losses and to thereby maintain rotation of the liquid mixture and to maintain the vortex during periods of no flow.

It is therefore apparent that a novel centrifugal separator is provided wherein the power required to operate the separator is reduced over conventional separators and is substantially constant irrespective of the flow of liquid mixture through the separator, and wherein the rotation of the liquid mixture within the separator is maintained during periods of no flow to prevent the liquid mixture from collecting in the lower portion of the separator.

In the drawings and specification there has been set forth a preferred embodiment of the invention and, although specific terms are employed, they are used in a generic and descriptive sense only and not for purposes of limitation, the scope of the invention being defined in the claims.

We claim:

1. A centrifugal separator for separating undesirable impurities from a liquid mixture comprising
   (a) an inlet chamber adapted to receive the liquid therein at a low inlet pressure,
   (b) an elongate vortex chamber communicating with said inlet chamber for receipt of liquid mixture therefrom, said vortex chamber having a cylindrical portion immediately adjacent the inlet chamber and an inverted conical portion disposed below said cylindrical portion and communicating therewith,
   (c) means disposed in said vortex chamber adjacent said inlet chamber for angularly accelerating the incoming, low pressure liquid mixture to sufficient angular velocity to create a vortex of said liquid mixture flowing downwardly and then upwardly in said vortex chamber, (d) discharge means connected to the lower end of the vortex chamber for collecting and discharging the undesirable impurities separated from the liquid mixture, (e) conduit means communicating with the central portion of said vortex chamber for siphoning off the lighter portions of liquid mixture from the vortex, and (f) rotatable means disposed in said vortex chamber in the path of the upwardly moving liquid mixture for recirculating the liquid mixture in the vortex and for recovering from the liquid mixture a portion of the energy imparted thereto by said accelerating means by being adapted to be at least partially driven thereby.

2. The structure set forth in claim 1, wherein said cylindrical portion of said vortex chamber has a larger diameter than said inlet chamber and said inlet chamber communicates with said vortex chamber adjacent the axis thereof, and wherein said conduit means comprises an outlet chamber above said inlet chamber and a rotatable siphon tube communicating with said outlet chamber and extending axially through said inlet chamber and into said vortex chamber and terminates therein in an open free end.

3. The structure recited in claim 1, wherein said accelerating means comprises a rotatable impeller including an imperforate circular baffle member disposed below said inlet chamber and first vane means mounted on the upper surface of said baffle member for accelerating the incoming liquid mixture, and wherein said rotatable energy recovering and recirculating means comprises second vane means mounted on the lower surface of said baffle member for recovering a portion of the energy from the upwardly moving liquid mixture prior to the same being drawn off by said conduit means and for recirculating the liquid mixture in the vortex.

4. A centrifugal separator for separating undesirable solid impurities from a liquid mixture comprising
(a) a cylindrical inlet chamber adapted to receive the liquid mixture therein at a low inlet pressure and having an outlet opening centrally disposed in the bottom thereof,
(b) an elongate vortex chamber disposed below and communicating with said inlet chamber through said outlet opening for receipt of liquid mixture therefrom, said vortex chamber having a cylindrical portion immediately adjacent the inlet chamber and of larger diameter than said outlet opening, and an inverted conical portion disposed below said cylindrical portion and communicating therewith,
(c) collection means connected to the lower end of the vortex chamber for collecting the undesirable solid impurities separated from the liquid mixture for subsequent discharge,
(d) an outlet chamber mounted above said inlet chamber,
(e) rotatable siphon tube means communicating with said outlet chamber and extending axially through said inlet chamber and into said vortex chamber for siphoning off the lighter portions of liquid mixture from the vortex and delivering the same to said outlet chamber for discharge from the separator,
(f) an impeller mounted on said siphon tube means for rotation therewith in the cylindrical portion of said vortex chamber below said outlet opening of said inlet chamber and comprising
(1) an imperforate circular baffle member of a diameter exceeding the diameter of said outlet opening,
(2) first vane means carried by the upper surface of said baffle member and rotatable therewith for angularly accelerating the liquid mixture entering said vortex chamber from said inlet chamber to a sufficient angular velocity to cause the same to move outwardly into the outer portion of the vortex chamber by centrifugal force to thereby create the vortex, the liquid mixture in the thusly created vortex moving downwardly into the conical portion of said vortex chamber which forces the rotating liquid mixture inwardly toward the axis thereof to thus increase the angular velocity thereof, the rotating liquid mixture then turning upon itself and moving upwardly interiorly of the downwardly moving liquid mixture, and
(3) second vane means mounted on the lower surface of said baffle member in the path of the unpwardly moving liquid mixture in the vortex for recovering energy therefrom by being adapted to be least partially driven by the liquid mixture and for recirculating the liquid mixture in the vortex chamber, and
(f) drive means operatively connected to said siphon tube means for rotating the same and said impeller at a predetermined speed.

5. The structure set forth in claim 4, wherein said first vane means comprises a plurality of circularly arranged spaced apart vanes having inner ends terminating substantially in vertical alinement with the periphery of said outlet opening of said inlet chamber and being tangent thereto, and said vanes curving outwardly from their inner ends and rearwardly relative to the direction of rotation of said baffle member and having outer ends terminating substantially at the periphery of said baffle member.

6. The structure set forth in claim 4, wherein said second vane means comprises a plurality of circularly arranged spaced apart vanes having inner ends and curving outwardly therefrom and rearwardly relative to the direction of rotation of said baffle member.

7. A centrifugal separator for separating undesirable solid impurities from a liquid mixture comprising
(a) a cylindrical inlet chamber adapted to receive the liquid mixture therein at a low inlet pressure and having an outlet opening centrally disposed in the bottom thereof,
(b) an elongate vortex chamber disposed below and comunicating with said inlet chamber through said outlet opening for receipt of liquid mixture therefrom, said vortex chamber having a cylindrical portion immediately adjacent the inlet chamber and of larger diameter than said outlet opening and an inverted conical portion disposed below said cylindrical portion and communicating therewith,
(c) collection means connected to the lower end of the vortex chamber for collecting the undesirable solid impurities separated from the liquid mixture for subsequent discharge,
(d) an outlet chamber mounted above said inlet chamber,
(e) rotatable elongate siphon tube means having a plurality of openings therein communicating with said outlet chamber and having an open free end in said vortex chamber a predetermined distance below said outlet opening of said inlet chamber for siphoning off the lighter portions of liquid mixture from the vortex and delivering the same to said outlet chamber for discharge from the separator,
(f) an impeller mounted on said siphon tube means for rotation therewith in the cylindrical portion of said vortex chamber below said outlet opening of said inlet chamber and immediately adjacent thereto said impeller comprising
(1) an imperforate circular baffle member of a diameter exceeding the diameter of said outlet opening,
(2) first vane means carried by the upper surface of said baffle member and rotatable therewith for angularly accelerating the liquid mixture entering said vortex chamber from said inlet chamber to a sufficient angular velocity to cause the same to move outwardly into the outer portion of the vortex chamber by centrifugal force to thereby create the vortex, the liquid mixture in the thusly created vortex moving downwardly into the conical portion of said vortex chamber which forces the rotating liquid mixture inwardly toward the axis thereof to thus increase the angular velocity thereof, the rotating liquid mixture then turning upon itself and moving upwardly interiorly of the downwardly moving liquid mixture, and (3) second vane means mounted on the lower surface of said baffle member in the path of the upwardly moving liquid mixture in the vortex for recovering energy therefrom by being adapted to be at least partially driven by the liquid mixture, and for recirculating the liquid mixture in the vortex chamber, said open free end of said siphon tube means being disposed a sufficient distance below said second vane means so that any turbulence which may be created by said second vane means will not interfere with the siphoning off of the lighter portions of the liquid mixture by said siphon tube means, and (g) drive means operatively connected to said siphon tube means for rotating the same and said impeller at a predetermined speed.

8. A centrifugal separator for separating undesirable solid impurities from a liquid mixture comprising (a) a cylindrical inlet chamber adapted to receive the liquid mixture therein at a low inlet pressure and having an outlet opening centrally disposed in the bottom thereof, (b) an inlet conduit connected to said inlet chamber in offset relation to the center line thereof for delivering the liquid mixture to said inlet chamber at a low inlet pressure and generally in a direction to cause said liquid mixture to assume a rotary path of travel in the inlet chamber, (c) an elongate vortex chamber disposed below said inlet chamber and communicating with said outlet opening thereof for receipt of liquid mixture from said inlet chamber, said vortex chamber having a cylindrical portion immediately adjacent the inlet chamber and of larger diameter than said outlet opening of said inlet chamber and an inverted conical portion disposed below said cylindrical portion and communicating therewith, (d) a collection chamber disposed below and communicating with the lower end of said conical portion of said vortex chamber for collecting undesirable solid impurities separated from the liquid mixture therein and having an outlet opening therein for discharge of the collected impurities, (e) discharge valve means disposed in said collection chamber and movable between a first position wherein the outlet opening in said collection chamber is closed for collecting the solid impurities therein and a second position wherein the outlet opening of said collection chamber is open for discharge of the solid impurities from the collection chamber, (f) a cylindrical outlet chamber mounted above said inlet chamber, (g) a rotatable siphon tube extending generally along the center line of said outlet chamber, said inlet chamber and said vortex chamber and having a plurality of openings therein communicating with said outlet chamber and having an open free end in said vortex chamber a predetermined distance below said outlet opening of said inlet chamber for siphoning off the lighter portions of liquid mixture from the vortex and delivering the same to said outlet chamber, the siphoned off liquid mixture assuming a rotary path of travel in said outlet chamber, (h) an outlet conduit connected to said outlet chamber in off-set relation to the center line thereof and generally tangentially to the rotary path of travel of the liquid mixture in said outlet chamber for discharging the liquid mixture from the separator at substantially the same pressure as the incoming liquid mixture in said inlet conduit, (i) an impeller mounted on said siphon tube means for rotation therewith in the cylindrical portion of said vortex chamber below said outlet opening of said inlet chamber and immediately adjacent thereto, said impeller comprising (1) an imperforate circular baffle member of a diameter exceeding the diameter of said outlet opening of said inlet chamber, (2) first vane means carried by the upper surface of said baffle member and rotatable therewith for angularly accelerating the liquid mixture entering said vortex chamber from said inlet chamber to a sufficient angular velocity to create the vortex, the liquid mixture in the thusly created vortex moving downwardly in the vortex chamber and then upwardly interiorly of the downwardly moving liquid mixture, and (3) second vane means mounted on the lower surface of said baffle member in the path of the upwardly moving liquid mixture in the vortex for recovering energy therefrom by being adapted to be at least partially driven by the liquid mixture, and for recirculating the liquid mixture in the vortex chamber, (j) drive means operatively connected to said siphon tube means for rotating the same and said impeller at a predetermined speed.

9. A centrifugal separator for separating undesirable solid impurities from a liquid mixture comprising (a) a cylindrical inlet chamber adapted to receive the liquid mixture therein at a low inlet pressure and having a centrally disposed outlet opening in the bottom thereof, (b) an upper elongate vortex chamber disposed below and communicating with said outlet opening of said inlet chamber for receipt of liquid mixture therefrom, said vortex chamber having a cylindrical portion immediately adjacent said outlet opening and of larger diameter than said outlet opening, and an inverted conical portion disposed below said cylindrical portion and communicating therewith, (c) a lower elongate vortex chamber disposed below and communicating with said upper vortex chamber, said lower vortex chamber including a cylindrical portion immediately adjacent the conical portion of said upper vortex chamber and of a diameter substantially the same as the diameter of the lower end of said conical portion of said upper vortex chamber, and an inverted conical portion below said cylindrical portion of said lower vortex chamber and communicating therewith, (d) collection means connected to the lower end of the lower vortex chamber for collecting the undesirable solid impurities separated from the liquid mixture for subsequent discharge, (e) a cylindrical outlet chamber above said inlet chamber, (f) a rotatable siphon tube communicating with said outlet chamber and extending axially through said inlet chamber and into said upper vortex chamber and terminating in an open free end for siphoning off the lighter portions of liquid mixture from the vortex, (g) a rotatable impeller mounted on said siphon tube for rotation therewith in the cylindrical portion of said upper vortex chamber below said inlet chamber and comprising (1) an imperforate circular baffle member of a diameter exceeding the diameter of said inlet chamber, (2) first vane means mounted on the upper surface of said baffle member and rotatable therewith for angularly accelerating the liquid mixture entering said upper vortex chamber from said inlet chamber to a sufficient angular velocity to cause the same to move outwardly into the outer portion of the upper vortex chamber by centrifugal force to thereby create the vortex, the liquid mixture moving downwardly through the conical portion of the upper vortex chamber where its angular velocity is increased, through the cylindrical portion of the lower vortex chamber and into the conical portion of the lower vortex chamber where its angular velocity is further increased, the liquid mixture then moving upwardly interiorly of the downwardly moving liquid mixture, and (3) second vane means mounted on the lower surface of said baffle member in the path of the upwardly moving liquid mixture of the vortex for recovering from the liquid mixture a portion of the energy imparted thereto by said first vane means prior to the liquid mixture being drawn off by said siphon tube and for recirculating the liquid mixture in the upper and lower vortex chambers, and (h) drive means operatively connected to said siphon tube for rotating said siphon tube and said impeller at a predetermined speed.

References Cited by the Examiner

UNITED STATES PATENTS

| | | | |
|---|---|---|---|
| 2,701,642 | 2/1955 | Goodwin | 209—211 |
| 2,996,187 | 8/1961 | Payne | 210—512 X |

REUBEN FRIEDMAN, *Primary Examiner.*